US007710958B2

(12) United States Patent
Bosschaert et al.

(10) Patent No.: US 7,710,958 B2
(45) Date of Patent: May 4, 2010

(54) METHOD FOR RECOVERABLE MESSAGE EXCHANGE INDEPENDENT OF NETWORK PROTOCOLS

(75) Inventors: Allaert J. D. Bosschaert, Skerries (IE); Seán P. Baker, Greystones (IE); David J. Hayes, Mount Saint Annes (IE); Jamie Vaughan Osborne, Beaver Row (IE); Eric Andrew Newcomer, Groton, MA (US)

(73) Assignee: IONA Technologies Limited (BM)

( * ) Notice: Subject to any disclaimer, the term of this patent is extended or adjusted under 35 U.S.C. 154(b) by 776 days.

(21) Appl. No.: 11/307,056

(22) Filed: Jan. 20, 2006

(65) Prior Publication Data

US 2007/0174393 A1     Jul. 26, 2007

(51) Int. Cl.
*G06F 15/16*     (2006.01)

(52) U.S. Cl. .................... 370/389; 370/474; 370/230; 709/206

(58) Field of Classification Search ................. 370/474, 370/232, 329, 230; 709/228, 203, 238; 455/466
See application file for complete search history.

(56) References Cited

U.S. PATENT DOCUMENTS 7,145,889 B1 * 12/2006 Zhang et al. ............... 370/329
7,184,402 B1 * 2/2007 Sharma et al. ............. 370/232
2004/0120349 A1 * 6/2004 Border et al. .............. 370/474
2004/0131014 A1 * 7/2004 Thompson et al. ......... 370/230
2005/0124360 A1 * 6/2005 Choi ......................... 455/466
2005/0193127 A1 * 9/2005 Moore et al. ............... 709/228
2007/0156919 A1 * 7/2007 Potti et al. ................. 709/238

OTHER PUBLICATIONS

"The Session Layer"; http://www.scit.wlv.ac.uk/~jphb/comms/std.osimr5.html.
"The ISO Open Systems Interconnection Reference Model"; http://www.scit.wlv.ac.uk/~jphb/comms/std.7layer.html.
"ISO-SP: OSI Session Layer Protocol (X.225, ISO 8327)"; http://www.javvin.com/protocolISOsession.html.

* cited by examiner

*Primary Examiner*—Dang T Ton
*Assistant Examiner*—Mohamed Kamara
(74) *Attorney, Agent, or Firm*—IP Authority, LLC; Ramraj Soundararajan

(57) ABSTRACT

A remote mobile device periodically connects with a centralized data server to receive updated information. Because of the mobile nature of the remote device, a download of all available information may not be able to be completed during the initial network connection. When the mobile device can again reconnect to the centralized data server, the two machines are able to continue the exchange of information even if the new network connection uses different underlying technologies or different connection protocols. A fragmentation layer is used in the protocol stack above the transport layer to separate messages into chunks. By tracking which chunks are successfully sent between the two machines, the efficient exchange of messages can occur across multiple, different network connections.

22 Claims, 4 Drawing Sheets

METHOD FOR RECOVERABLE MESSAGE EXCHANGE INDEPENDENT OF NETWORK PROTOCOLS

RELATED APPLICATIONS

The present application relates to copending U.S. patent application Ser. No. 11/164,116 filed on Nov. 10, 2005, the disclosure of which is herein incorporated by reference in its entirety.

FIELD OF INVENTION

The present invention relates generally to the field of distributed communications systems. More specifically, the present invention is related to such systems in which one of the participants experiences a disconnection associated with data transfer.

DISCUSSION OF PRIOR ART

Recent advances in wireless and other connectivity technologies related to the Internet have allowed users, such as workers, to access company data without being confined to the physical boundaries of a corporate network. However, reliance on remote connections can sometimes leave workers disconnected from critical data when they are unable to remotely access the corporate resources and data.

Current methods for maintaining up-to-date information for remote users have typically relied on a "pull" model in which remote users connect to the corporate resources when possible and search for and download new data such as price lists or other information. This model requires users to search for and locate relevant information. This activity may take as long as or longer than the actual downloading of the information. Furthermore, if large amounts of data must be downloaded, the remote user must hope that the remote connection stays active long enough to complete the download. Otherwise, the download may be abruptly terminated and the download restarted at some other time.

For many years, IT efforts have concentrated on the server side of distributed computing: providing integrated application services and back-end data to clients that were connected via high-speed links. The focus on the server side was necessary because the vast majority of applications used a tightly coupled, synchronous communication model. Applications were constructed with this model as the design center, but they did not work very well with mobile, occasionally connected clients. People have attempted to solve this problem in a number of ways, including "thin client" computing, web browser-based applications, and various data caching strategies. But these approaches do not change the inherent disadvantages of using synchronous, tightly bound, client/server applications in a mobile environment. Whatever the precise merits, features, and advantages of the above cited references, none of them achieves or fulfills the purposes of the present invention.

SUMMARY OF THE INVENTION

Accordingly, aspects of the present invention relate to a system and method that simplify maintaining up-to-date information on computer systems that are sometimes connected to a network and sometimes disconnected. Thus, embodiments of the present invention relate to a method for exchanging information between two devices in which an initial network connection may be interrupted during the exchange. When a second, different network connection is established between the two devices, the exchange of information continues where it was interrupted. In this way, an interrupted exchange does not need to re-start from its beginning once it is re-established.

According to one particular example, a remote, mobile device periodically connects with a centralized data server to receive updated information. Because of the mobile nature of the remote device, a download of all available information may not be able to be completed during the initial network connection. When the mobile device can again reconnect to the centralized data server, the two machines are able to continue the exchange of information even if the new network connection uses different underlying technologies or different connection protocols. A fragmentation layer is used in the protocol stack above the transport layer to separate messages into chunks. By tracking which chunks are successfully sent between the two machines, the efficient exchange of messages can occur across multiple, different network connections.

DESCRIPTION OF THE PREFERRED EMBODIMENTS

Figure 1:
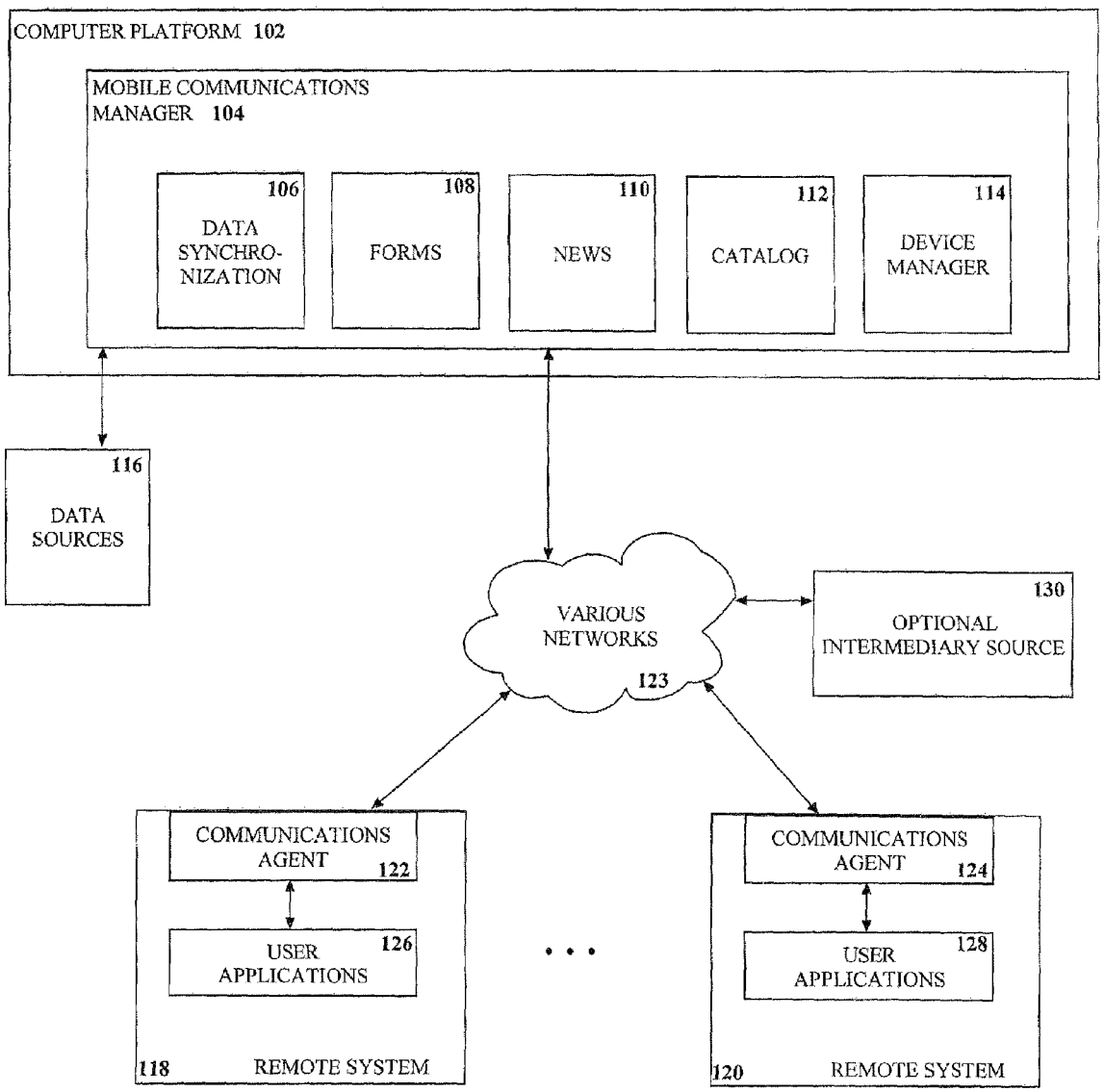
FIG. 1 illustrates a schematic view of an example computer environment for various embodiments of the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention. For example, the present invention should not be limited to occasionally connected devices. Devices for which a connection is not immediately available, or which become disconnected during a transmission are equally applicable and fall within the scope of the present invention.

Additionally, the present invention provides for an article of manufacture comprising computer readable program code contained within implementing one or more modules to control the exchange of messages between machines that can be periodically disconnected. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Embodiments of the present invention relate to a system and method that simplify maintaining up-to date information on computer systems that are sometime connected to a network and sometimes disconnected. For example, a user may have a mobile device (for example, a laptop, PDA, phone, etc) that is occasionally connected to a network. When connected, a user may wish to receive files/documents/messages from another machine to his own machine; and/or he may wish to send files/documents/messages from his machine to another machine. This sending and receiving could take place to/from machines controlled by the user's company, or some other set of machines.

Embodiments of the present invention provide "unconscious connectivity"—meaning the ability to perform useful business functions without having to consciously access the server—and the ability for systems to manage connections, updates, and synchronization automatically and intelligently, without user intervention and interruption. This approach effectively reverses the polarity of the Internet meaning that the emphasis will change from the server side of the equation to the client side. No longer will the primary concern be the efficient use of the server—rather, mobile systems will radically improve the efficiency of users, in addition to significantly offloading the processing burden of servers.

Some of the specific examples described herein are worded in terms of uploading or downloading a file, document or message (or set of these) to or from a user machine. This should not be interpreted to limit the scope of the present invention, which can in fact be used to transfer files, documents, messages or other data between or within any type of machine. The terms upload and download should be interpreted in a general way to include the sending and receiving of any data, in either direction. Similarly, the terms pull and push depend on the perspective of the recipient and the sender. Thus, even though these terms are used in specific examples, they are not meant to limit the embodiments of the present invention to only specific communications models.

The term file/document/message is used to refer to any data. Examples include but are not limited to the following (or parts thereof): files on computer disk or other memory; user readable documents such as those produced by word processors/formatters; spreadsheet applications or other applications; forms; books, newspapers; journals; magazines; articles; news-letters; news-flashes; email messages; contact details (e.g.,. in vCard format); executable applications; data files; databases; portions of databases; tables; requests to remotely accessible APIs (such as Web Services, CORBA or other middleware entities); replies to such requests; and so on.

When used by itself, the term message is used to refer to a message constructed, and possibly queued, with the aim of transmitting it between machines. Such a message may contain one or more files/documents/messages or parts of one or more of these. Yet other messages could be system messages, containing system level data, such as one or more acknowledgements or parts of these, supervisory/administration information or commands, and so on. Yet other messages can be requests to remotely accessible APIs, or a corresponding reply.

The term directory is used to mean any grouping of files/documents/messages, including, but not limited to, a folder in a hierarchical file system.

A term filter refers to a condition or expression that can be evaluated against a set of files/documents/messages or messages to determine which satisfy the condition/expression and which do not. As described in more detail below, a filter can be specified in terms of the name(s), associated stamp(s), formatting(s), type(s), contents, location(s) or other properties, or any combination of these, of a file/document/message or message (or any set of these).

The term connection (or binding) is used to refer to the time that one machine is able to communicate with another, or with an intermediary store A connection can be set up on any underlying communications facility (e.g., whether it be connection-oriented or connection-less).

Implemented in computer program code based products are software modules for orchestrating communications and connectivity between various machines. FIG. 1 illustrates a schematic depiction 100 of one example computer environment for various embodiments of the present invention. FIG. 1 illustrates a schematic view of a computer application and platform that provides a general-purpose facility for sending and receiving messages between machines in an environment in which machines can sometimes be connected and sometimes be disconnected from each other. According to some embodiments, such connections can be direct, while in other embodiments, the connections may be through an intermediary. A computer platform 102 supports a mobile connections manager or orchestrator 104. As recognized by one skilled in this art area, the computer platform 102 can be a single microprocessor or a distributed group of processors and systems. Furthermore, a general-purpose computer with appropriate software may be used as well as a specialized, dedicated system.

The mobile connections manager 104 includes a suite of different functionalities. In one advantageous embodiment, these functionalities are provided by separate applications whose activities and behavior are coordinated by the manager 104. In this arrangement, the manager maintains a queue of messages from the applications that may potentially be delivered to one or more other machines. FIG. 1 depicts merely a set of example applications, but others may be included as well.

A "data-synchronization" application 106 is arranged so as to be instructed to upload/download individual files/documents/messages, or a set of these, to/from a given machine. It can also be instructed to upload/download all of the files/messages in a directory or set of directories.

Furthermore, the data-synchronization application 106 is controlled to keep a machine (for example, a user's machine) or set of machines updated with the latest copies of all of the files/documents/messages in a specific directory or set of directories. If any files/documents/messages are changed in that directory or set of directories then this application will organize to have these updated files/documents/messages copied to the particular machine or machines.

Further, one or more filters may be specified so that automatic copying does not take place for all of the files/documents/messages in a directory or set of directories, but only those that satisfy the condition specified in the filters. A filter or filters can apply to a single given machine, or to a set of machines.

Another application is a "Forms" application 108 that ensures that the forms filled out by a user on his/her machine are transmitted to another machine or set of machines. Further, this application can be given a set of forms that a user or group of users is to fill out and it will ensure that these are transmitted to the user's machine or users' machines. By using forms, input from a user can be received in a uniform format and structure which simplifies processing of data.

However, one of ordinary skill will recognize that the use of forms is not required but merely provides advantages over free-form input.

A "news" application 110 is useful to download a copy (or part thereof) of a newspaper, newsletter, book, journal, magazine, news-flash, or other document or set of documents, periodically or when a new instance or version is available.

A "catalogue application" 112 is also provided that can be used to keep catalogues (e.g., sales catalogues) up-to-date in a machine or machines in remote or mobile offices, and/or on machines used by remote or mobile workers. Files/documents/messages including databases may be included in the data that has to be kept up to date on these machines.

A "device management" application 114 is used to deploy, and/or to keep updated, an application or set of applications on a set of machines. This "device management" application 114 can be instructed to load the application or set of applications onto the set of machines or appliances. Further, it can in addition or alternatively be instructed to load new versions of this application or these applications onto these machines when they become available. Machines and appliances can be of any size: devices, larger machines such as PDA or phones, still larger machines such as laptops, still larger machines such as desktops, still larger machines such as servers, and so on.

In addition to maintaining copies of individual applications, or instead, a whole or partial memory (disk, main memory, or other) image can be loaded onto these machines, and/or kept up to date.

In one example embodiment, the device management application 114 can be combined with the "data synchronization" application 106 so that applications as well as other types of files/documents/messages can be loaded, and/or be kept up to date, on a set of machines.

The example application just described as well as the manager 104, have access to various data sources 116 that store or collect the data and information used by the individual applications. Data sources 116 are depicted as a monolithic element in FIG. 1; however, one of ordinary skill will recognize that these data sources may be arranged in a variety of ways on a variety of storage platforms without departing from the scope of the present invention.

The computer platform 102 communicates with a number of remotely located machines 118, 120 by a variety of different network types 123 and a variety of different transport protocols. Examples include but are not limited to: LAN, phone-based dial up connection, leased line, GPRS, Bluetooth and WiFi.

These networks 123 and underlying protocols differ in their characteristics, such as: their bandwidth; their latency; the cost model for using them (price per connection; price per time unit; price per unit byte of transfer); the cost within the particular cost model (for example: the actual price per unit byte of transfer; the actual price per connection; and so on); their reliability (the expectation that a connection will remain available once set up). This differs greatly between a LAN, GPRS, a phone based dial up connection, WiFi and so on. Another distinguishing characteristic between different types of networks are their ability to allow a user to move while connected, and the limits of such mobility.

In accordance with the principles of the present invention, a respective agent application 122, 124 operates on each remote machine 118, 120 to provide connectivity to the mobile communications manager 104. In this manner, the various applications 126, 128 that are running on the remote machines 118, 120 communicate with the applications 106-114 on the computer platform 102 using the resources of the connections manager 104 and the agents 122, 124. Together, these components (i.e., 104, 122, 124) provide a connection model, or "stack" that supports the ability for systems to manage connections, updates, and synchronization automatically and intelligently, without user intervention and interruption. The applications 126, 128 running on the remote systems 118, 120 include traditional business applications but also advantageously include applications corresponding to those on the computer platform 102 such as applications 106, 108, 110, 112, 114. In this way, the remote systems 118, 120 can fill out forms, download news, synchronize data and files and have access to the latest information.

The Protocol Stack

Figure 2:
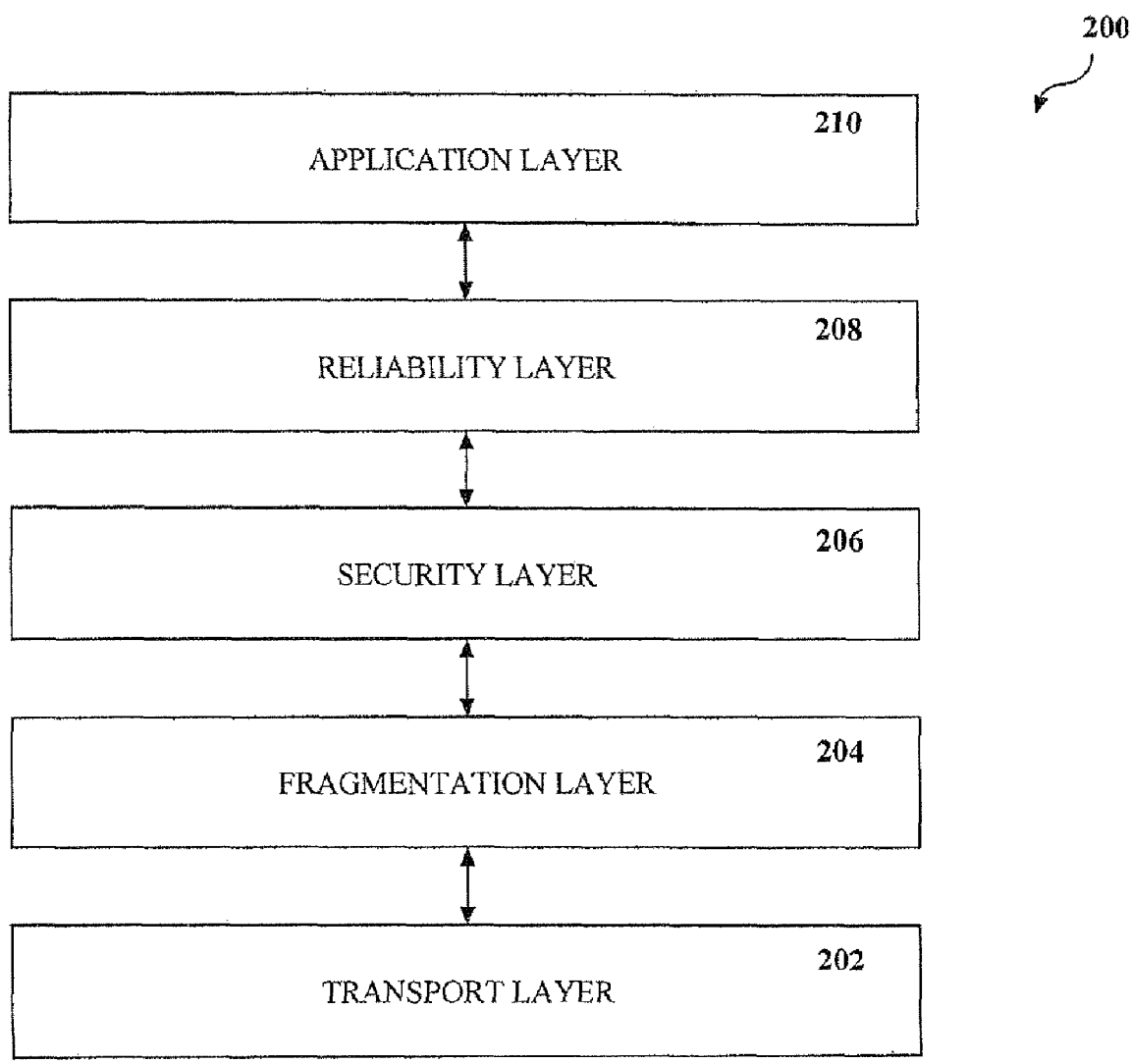
FIG. 2 illustrates an example protocol stack in accordance with the principles of the present invention.

FIG. 2 illustrates details about the communications model, or protocol stack 200, implemented by the interaction of the components illustrated in FIG. 1. The protocol stack of FIG. 2 is provided by way of example and one of ordinary skill will recognize that the functionality of the different layers may be combined or re-arranged without departing from the scope of the present invention. This protocol stack exists on both the computer platform 102 and the remote machines 118, 120.

The transport layer 202 is responsible for the actual transmission of messages. In some embodiments, it uses direct transmission from one machine to another. In yet other embodiments, it uses an intermediary store 130, so that the transmitting side sends a message to the store 130, and the store 130 either sends this message to the intended receiver or the receiver pulls it from the store 130. The store can be a separate machine, or process, or it can be on the same machine or even in-process with the sender or receiver. It is expressly contemplated that this transport layer may use protocols such as FTP, HTTP, HTTPS, NFC, IIOP, other industry standard protocols, and specialized protocols. One of ordinary skill will recognize that there are additional abstract layers below the transport layer according to conventional communications models. Embodiments of the present invention advantageously rely on these conventional protocol layers and their industry-accepted implementations and, therefore, these layers are not described herein in detail.

The chunking, or fragmentation, layer 204 is responsible for breaking a message into a series of smaller messages, sometimes called chunks or fragments, which can be transmitted separately and re-combined at the other side to reconstruct the message. According to one embodiment of the present invention, the communication protocols can be configured to allow or disallow chunks from more than one message to overlap. In the former, it is not necessary to upload/download all of the chunks from one message before starting the uploading/downloading of chunks of other messages.

The security layer 206 is an optional layer that may be utilized to provide data security over an established communications link. Embodiments of the present invention contemplate using security layer techniques as would be known to one of ordinary skill in the art.

The reliability layer 208 is responsible for ensuring that messages get to their intended destination despite unreliability in the network or networks (and possible intermediaries) that connect the sender and receiver. For example, the reliability layer deals with the fact that machines can sometimes communicate because there is a network of some type available to connect them, while at other times there is no such network and they cannot communicate. Among other duties, this layer 208 handles the acknowledgement messages sent by a receiver to a sender in order to acknowledge receipt of a message or a set of messages.

The application layer 210 is typically the layer where the user directly interacts with the system. This layer 210 receives input generated by a user and passes it to the lower layers of the stack 200. In the opposite direction, data passed up from the lower layers is presented as output to a user through the application layer 210.

Efficient Exchange of Messages

Within the framework of the environment described in FIGS. 1 and 2, a number of efficiency mechanisms are contemplated in embodiments of the present invention.

These mechanisms allow users to monitor and control the use of the underlying network and protocols. For example, at least one embodiment of the present invention contains a set of features that allow users to monitor and control how the available bandwidth for transmission is used to match their requirements. Without such monitoring and control, the use of the bandwidth may not match a user's needs. For example, one or more files/documents/messages may be uploaded/downloaded after the uploading/downloading of others that the user requires less urgently, even though the former were available at the time that the latter were uploaded/downloaded.

To provide such functionality, users are allowed to select which messages to download/upload, and which should be skipped for later. Although under ideal circumstances the user may want to download/upload all of the available/relevant messages, under certain low-bandwidth or high-cost connections the user may only want to download/upload messages that are most important to him at a particular time. Users therefore need control, but the control is advantageously provided in a way that they can benefit from without them having to understand the technical aspects of how messages are transmitted, or how messages are broken into smaller units in order to transmit them.

One particular method of providing such controls includes a mechanism called "message stamping" as fully described in the previously cited copending application Ser. No. 11/164,116. The stamps are associated with a set of rules that define: a) which messages a user wants to upload/download; b) the order in which they are to be uploaded/downloaded; and c) the allowable networks over which they can be uploaded/downloaded. Each message can have any number of stamps associated with it. Also, sets of related messages may be stamped with an overlapping set of stamps so that they can be treated as a unit with respect to the rules for uploading/downloading them. Embodiments of the present invention do not rely on a specific or particular format for the stamps. Instead, stamps can be implemented using a wide variety of techniques that allow communicating systems to identify the presence of a stamp and evaluate the value of that stamp.

The use of such stamps with messages may appear to be similar to other technologies such as firewalls and spam filters. However, there are some significant differences, for example, in accordance with the principles of the present invention, a message stamp is not part of the message content, and so the message does not have to be seen, downloaded or uploaded to get access to its stamp. In other words, the stamping mechanism described herein acts on messages before it decides whether or not to transfer them.

Figure 3:
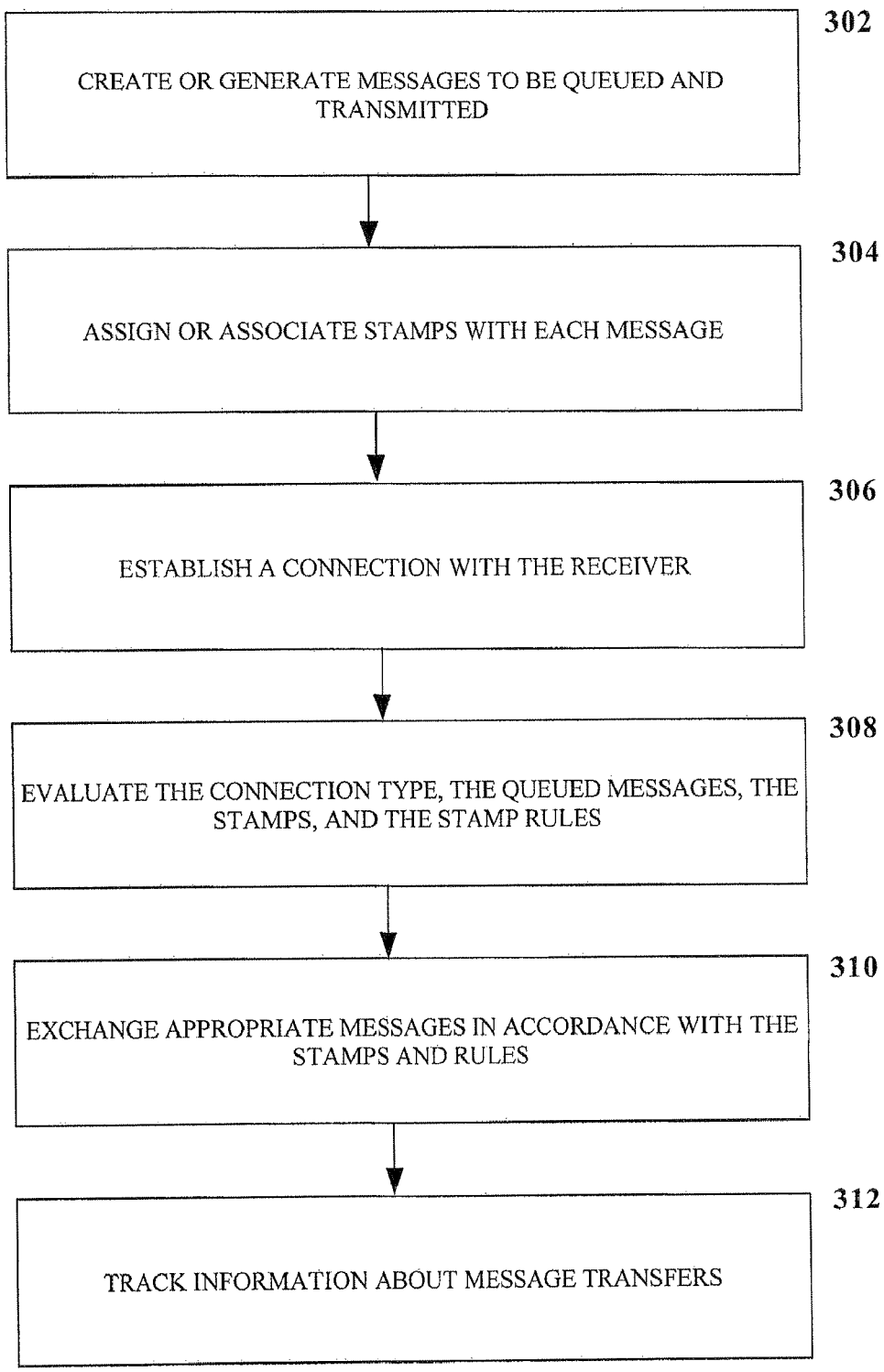
FIG. 3 illustrates a flowchart of an algorithm for assigning and utilizing stamps to control message transfers in accordance with the principles of the present invention.

FIG. 3 illustrates a flowchart of an exemplary method for utilizing stamps to control the transfer of messages in accordance with the principles of the present invention. Using this algorithm, the efficient exchange of data and information between machines that are periodically connected and disconnected is greatly simplified. In step 302, a computer platform, such as platform 102, generates and queues messages to be transmitted to one or more remote systems when these remote systems are connected. As described earlier, a "message" is a term that encompasses a wide variety of different data. These messages are generated by the example applications 106-114 and other applications running on the platform 102.

In step 304, a stamp or set of stamps is associated with each message. The assigning of stamps to a message may be accomplished by the connection manager 104 or the individual applications 106-114.

For example, the data-synchronization 106 application can associate a stamp or set of stamps to the messages related to the uploading/downloading of a file/document/message. Further, it can associate the same stamp or overlapping stamps to the messages related to the uploading/downloading of a set of files/documents/messages that appear in a particular directory or set of directories that the user wishes to upload/download or to keep up to date copies of on his/her machine. Stamps can be assigned in a way that makes sense to a business; such as, for example, assigning the same (or overlapping) stamps to the files/documents/messages related to a particular version of a product, whether or not these files/documents/messages are in the same folder in a hierarchical filing system. Yet another example is that the same (or overlapping) stamps can be assigned to the files/documents/message that fulfills a certain filter or set of filters.

Further, in this and other applications, stamps can be assigned depending on the content of a file/document/message. One of ordinary skill will recognize that the variety of ways in which stamps can be assigned are too numerous to explicitly enumerate. Stamps may be assigned based on particular users, particular groups of users, particular message content, etc. Furthermore, the method for assigning stamps can vary as well. For example, a user may be presented with a graphical use interface that allows the selection of files, the selection of recipients, and a selection of different stamps. Using this interface, a user may readily generate messages to be transmitted and assign the appropriate stamps.

As another example, the news application 110 that operates to load a copy of a newspaper or journal to a machine could assign the same stamp or overlapping stamps to all of the messages related to newspapers of the same type. Further, it could instead, or in addition, assign different stamps for different days of the week, or different stamps for week days in contrast to weekends, and so on. Special stamps could be assigned to the messages related to newspapers that fulfill certain filters, for example filters based on content (e.g., sports, finance, technical, etc.)

Once the stamps are associated with respective messages, this information is useful in controlling the transfer of messages once a connection is established, in step 306, between two machines using the protocol stack of FIG. 2. These two machines may be the platform 102 and a remote user 118, 120 or one of the machines may be an intermediary store 130.

In step 308, the machines evaluate the established connection, the messages that are queued to be exchanged, and the associated stamps. Using this information, the machines determine how to exchange one or more messages. In one configuration, a machine may push messages to another machine; while in another configuration a machine may pull messages from another machine. Regardless of the particular communication model being used, the stamps are used to control how the messages are transferred between machines. The exchange of appropriate messages occurs in step 310.

For messages being transmitted from a machine, such as the computer platform 102, the transport layer receives as input the set of messages that need to be sent (each with any number of stamps) and the set of rules for how the stamps are to determine details such as what is transmitted, the order of transmission, and how they are to be transmitted. Typically, the set of messages will often be ordered, or at least it will be possible to determine the order in which messages were added. This order can be taken into account when determining how to queue the messages for transmission. The machine performing the transmission of messages in this manner may be the computer platform 102, the intermediary store 130, or a remote machine 118, 120.

Depending on the underlying network connection or type, the set of messages to be sent can be reduced by the stamp-based rules (i.e., messages with certain stamps or combinations of stamps should not be transmitted). In addition to stamps related to network type, some stamps may be used to indicate content that should not be delivered on a weekday as opposed to a weekend or some stamps may determine that one group of machines is not to receive certain messages.

According to a "pull" model the transport layer of the receiving machine determines the set of message IDs (plus the stamp or set of stamps associated with each) for the set of messages that it could "pull" from another machine. The transport layer is also given a set of rules that determines details such as which messages it should "pull", the order in which to do this, and how. Where the set of messages are stored on a remote machine, the transport layer may use various techniques to get the set of message IDs for messages that it should "pull". For example, it can use some mechanism to get a "directory listing" of these message IDs plus their stamps (for example, using some FTP facility). Yet another example is that it could make a remote call to a server to request this information (using for example Web Services, CORBA or other middleware calls). Yet another example is that it could receive the list periodically or on some significant event from another machine (for example, from the one that holds the set of messages).

In the "pull" model, the set of messages that need to be "pulled" can be reduced by the stamp-based rules (i.e., messages with certain stamps or combinations of stamps should not be "pulled"). In addition or alternative, the set can also be reduced by use of filters. These filters can be held and processed on any machine, but it is advantageous to process these filters before messages are "pulled" so that network bandwidth is not wasted "pulling" messages that should be discarded. Therefore, when the "pulling" machine uses various mechanisms to determine the set of message IDs for messages that it should "pull", it is advantageous for it to receive a filtered list.

As described earlier, machines that transmit messages are assumed to be aware of the stamps and the rules of how to apply them. In some instances, however, it may be advantageous to have an intermediary store that is not aware of stamps or their implications for message transfers (e.g., a HTTP server, or FTP server). In such an instance, a "pull" model is beneficial in that the "puller" can retrieve the message IDs, the associated stamps, and pull only those messages which are appropriate based on the stamps. In some implementations, a message ID includes the stamps associated with the message; while in others, the stamps are held separately but are associated with each message (or message ID). In the latter case, when a set of message IDs and stamps need to be transmitted, the stamps associated with each message are first determined and added to the transmission.

Stamps can be used in a variety of ways to control the exchange of messages. For example, stamps may be used such that only messages with a given stamp or a particular combination of stamps are exchanged. Further, the stamps can be used to control the order in which messages are uploaded/downloaded, and the priority given to such uploads/downloads. The priority is different to the order because priority can be used to control priority parameters in the underlying networks and protocols, whereas order purely determines the order or partial order in which messages are uploaded/downloaded.

Further, stamps can be used to control the limit of money, or "cost" associated with uploading/downloading given messages or sets of messages. The rules evaluating the stamps can be configured to allow the uploading/downloading of certain messages or sets of messages over networks that might cost money; whereas the uploading/downing of certain other messages or sets of messages can be restricted to occur over networks that do not cost money, or cost less than a certain threshold. Finer control can be gained, such as allowing the uploading/downloading of certain messages or sets of messages to take place over networks with a per-connection charge, but not ones that charge per byte unit sent. Further controls allow limits to be placed on the cost of uploading/downloading of certain messages or sets of messages.

Yet further controls allow stamps to be used to control the parameters of underlying transmission protocols or networks. For example, messages with certain stamps or combination of stamps could be transmitted across a certain underlying transmission protocol or network with a certain setting (such as fast speed), whereas messages with a different stamp combination could be allowed to also be transmitted with a different setting (such as low speed).

Embodiments of the present invention explicitly contemplate that stamps can be specified in a number of ways. A single stamp can be specified by name. Combinations of stamps can be specified in a number of ways: by a set/list of names; by Boolean expressions including the usual operators such as and and or (for example: aaa and bbb or ccc); by regular expression (for example, a*b+); and combinations of these approaches.

The association of stamps with messages provides a number of additional benefits. For example, embodiments of the present invention permit monitoring or tracking of message transfers based on stamp information, step 312. For example, the transport layer is able to monitor how far a connection session has progressed uploading/downloading a set of messages. This helps to answer questions such as "have all files/documents/messages with a certain stamp or combination of stamps (e.g. stamps a*a or bbb; or stamps xxx and yy+) been downloaded?". A user may be interested in knowing this so that, for example, he can disconnect his machine when those uploads/downloads have completed. A manager/supervisor may be interested in knowing that same information so that he can monitor what has been uploaded/downloaded onto a user's machine.

Monitoring also permits the estimation of how long it will take to upload/download messages with a certain stamp or combination of stamps. A variation on this is to ask how long it will take to finish uploading/downloading messages with a certain stamp or combination of stamps, where the work has already begun.

Asking the system to estimate how much it can upload/download if given n minutes connect time or n minutes more connect time; and getting the answer not just in terms of byte units (e.g., MBs) but in a more meaningful way involving groups of files/documents/messages (in particular, via their stamps). For example, a user may be told that all documents with stamps aaa can be downloaded in n minutes, together with 40% of those with stamps bbb or cc*.

Monitoring based on stamps also permits the communications session to automatically control the operation of the computer based on the progress of the message transfer. For example, a machine can be instructed to finish transmitting messages (and optionally to close the open connection or connections) once messages with a certain stamp or combination of stamps have been uploaded/downloaded. Yet another example is to specify that an audible or visual signal, and/or to send a particular type of event into an event system, when messages with a particular stamp or combination of stamps (for example, aaa, and bbb) have been uploaded/downloaded.

One of ordinary skill will recognize that the rules for evaluating stamps (and therefore controlling the transfer of messages) may be created at, stored in, and disseminated from, a variety of different locations without departing from the scope of the present invention. The rules may be locally generated on a remote machine by a user of that machine, or, alternatively may be created at a centralized location and disseminated to the remote machines. Accordingly, the user of the remote machine may control how messages are exchanged or, in the alternative scenario, a supervisor or other central figure may have more control over how messages are exchanged. A combination of user and centralized control may be implemented as well. One benefit of using a centralized store for the stamp rules is that updates can be performed on a single file and then disseminated to all the applicable machines.

Reliability

Figure 4:
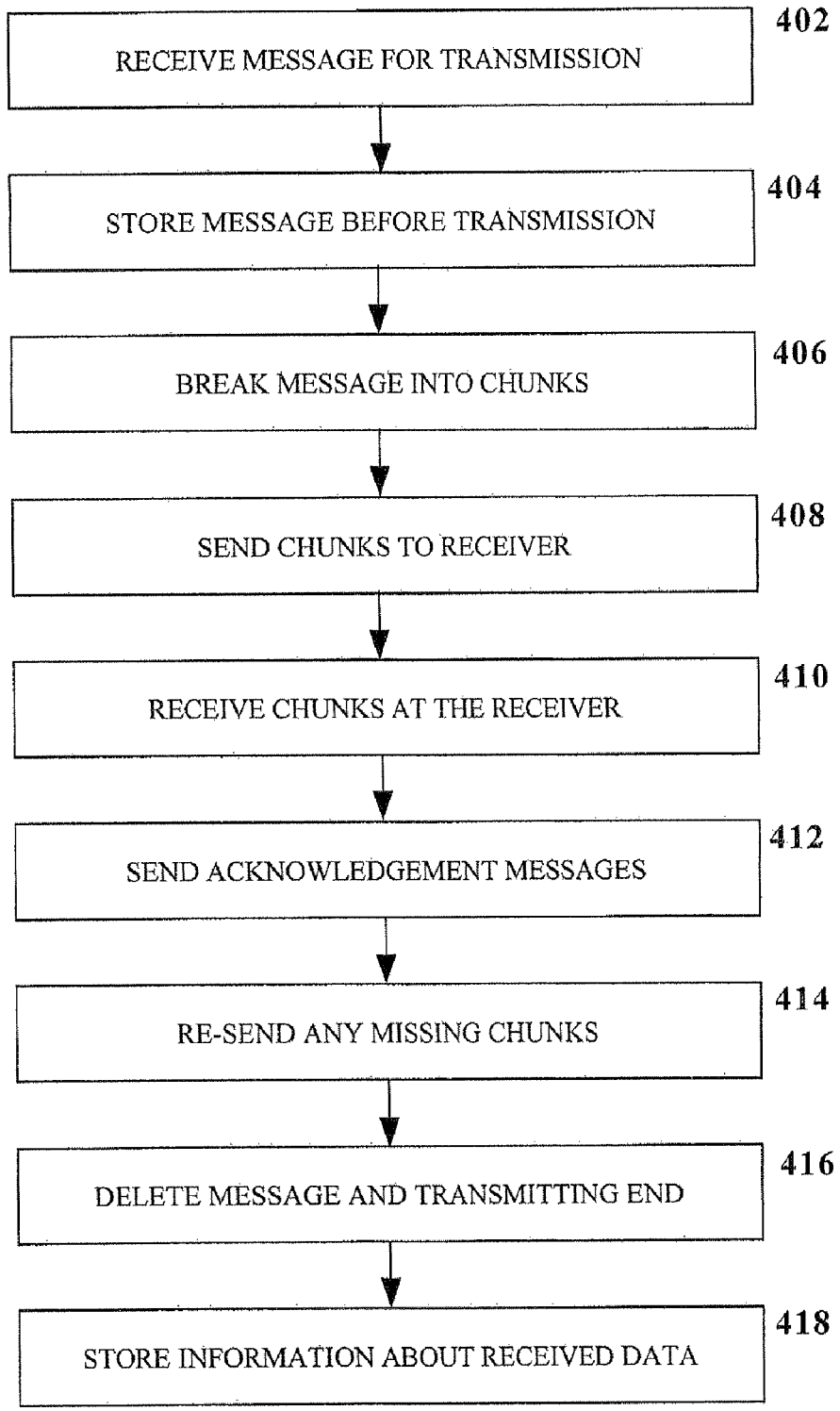
FIG. 4 illustrates a flowchart of an algorithm for the recoverable exchange of messages between periodically disconnected machines.

FIG. 4 illustrates a flowchart of an example algorithm for exchanging messages in accordance with the principles of the present invention. The algorithm of FIG. 4 is applicable to communications between the platform 102 and an intermediate store 130, between the intermediate store 130 and a remote machine 118, 120, or directly between the platform 102 and the remote machine 118, 120.

On the transmitting machine, the message to be sent is received from, or generated by, an application, in step 402. Typically, this message is stored, in step 404, in some type of persistent queue so that it can be easily re-sent if there is difficulty in transmitting the message.

The fragmentation layer, or chunking layer, breaks the message into chunks, in step 406. Each machine has one or more chunk sizes that determine the size of the chunks that are created from large messages. A single (general) chunk size can apply to all types of underlying networks/protocols; alternatively there can be an individual chunk size for each network/protocol or grouping of these, and/or for each message type.

Where two machines communicate via an intermediary store, the two machines can use different chunk sizes. In particular, one chunk size can be used to send messages from the first machine to an intermediary store, and the same or a different chunk size can be used to send messages from an intermediary store to the second machine.

The overall system benefits if an intermediary store knows the chunk size of the second machine (either its general chunk size, or the chunk size relevant to the network/protocol being used and/or message type being transmitted). The intermediate store can determine this information by interrogating the second machine (e.g., by calling a remote interface on that machine), or by using a table of such information (held on itself or on another machine). Further, it can cache this information for a period of time. If the chunk size (general or specific to a network/protocol and/or message type being transmitted) changes then the intermediary store can be informed of the change, or it can be allowed to use the old chunk size until its caching time period expires. In some cases, machines will receive chunks of a different size to the current relevant chunk size.

Alternatively, the intermediary store can be the location for storing the chunk size information, and each machine can register its chunk size or sizes with the intermediary store; or, alternatively, some third party can do this for some or all of the machines. The intermediary store can be informed if it is necessary to change the chunk size(s) associated with a given machine. Again, in some cases, machines will receive chunks of a different size to the current relevant chunk size.

Where machines communicate directly without an intermediary store, the chunk size should advantageously be agreed between them. One machine can be the dominant communicator, in the sense that its chunk size will be used. Alternatively, the chunk size that's used can be a compromise between the two positions (e.g., the average). One of the advantages of an intermediary store is that the sender and receiver of messages can use different chunk sizes for the same message.

The chunks are then transmitted using the transport layer, in step 408. The receiving machine receives the chunks, in step 410, but not necessarily in the same order they were sent. In response to receiving a chunk, the receiving machine returns an acknowledgement message in step 412. One typical method is to group acknowledgement messages so that there is not a requirement to send a separate acknowledgement message for each individual chunk.

At the sender's end, a time-out interval may be utilized to determine if a chunk was not received by the receiver. In case an acknowledgement message is not received for a particular chunk during the time-out interval, the sender re-sends the chunk, in step 414. One of ordinary skill will recognize that the sending and receiving of acknowledgement messages can be performed in a variety of alternative ways without departing from the scope of the present invention.

Once a message is acknowledged from the receiving machine, the sending machine will remove the message, in step 416, from its storage location. Another typical (but not required) behavior is for the receiving end, in step 418, to store information about received messages so that if duplicates arrive, they can be discarded.

Handling Connections/Disconnections

The algorithm of FIG. 4 may appear similar to some current methods used to provide a communication links over an always-connected link. However, in accordance with the principles of the present invention, the reliability layer and chunking layer provide for the recoverable uploading/downloading of messages despite disconnections.

During the time that is required to exchange messages between machines, a remote machine 118, 120 is likely to use a series of connection sessions, potentially using different connection types, to eventually complete the uploading/downloading of a message or set of messages. A subset of the required upload/download messages may take place on a first connection. If this upload/download of the message or messages does not complete when the first connection breaks, the machines will eventually set up a second connection (for example, when the user gets into range of another WiFi base station). Even if this second connection is of a different type to the first, the remote machine 118, 120 will continue the requested upload/download of the message or messages from where it stopped previously. It is possible that a third and subsequent connection (each possibly of a different type) may be required to complete the requested upload/download of the message or messages. One or more of the machines involved can be shutdown, suspended or hibernated between connections, yet in accordance with the principles of the present invention, the machines will continue with the required uploading/downloading when the necessary machines are running again.

In practice, a connection can break for many reasons, including some communication difficulty; a timeout of some sort; some issue at a higher level of the system (e.g., closing down of some services); a system shutdown, suspension or hibernation.

This use of multiple connections of the same or different types can be used to progress the uploading/downloading of a single message (in particular, where it is big) or a set of messages. A connection may break during the middle of the uploading/downloading of an individual message, or it may break after completing the uploading/downloading of one message and before the starting of the uploading/downloading of another message in the required set.

Embodiments of the present invention provide this functionality using a combination of features, including: the use of stamps, the chunking layer, the reliability layer, the transport layer and intermediary store(s) (if they are in the configuration).

Using stamps, and/or any other mechanism, the machines are able to determine what messages need to be uploaded/downloaded. The machines remember this set of messages, and if it cannot complete the upload/download in one connection then it will continue uploading/downloading this set when a new connection is established. Further, the set of messages that is to be uploaded/downloaded can change between connections, or during a connection. This can arise for many reasons, including: new files/documents/messages have been created; old ones have been removed; the contents, location or other properties of some files/documents/messages have changed; new system messages have been created or old ones removed; the set of stamps associated with one or more messages have changed; the rules for how stamps affect the uploading/downloading of messages have changed; and so on.

When receiving messages, the chunking layer is used to split an overall message into smaller messages. A series of one or more of these can be received during one connection, and when the connection is broken it may be the case that only some of one or more overall messages may have been received (while some other overall messages may have been received in full). These messages that constitute part of one or more overall messages can be stored on storage at the receiving machine. The receiver can remain running, or power down and power back up again, and establish a new connection. Once a new connection has been established, further chunks can be received. Over a series of one or more connections, all of the chunks that make up an overall message can be received.

When sending messages, a series of one or more chunks can be sent during one connection, and when the connection is broken it may be the case that only some of one or more overall messages may have been sent (while some other overall messages may have been sent in full). The sender can remain running, or power down and power back up again, and establish a new connection. Once a new connection has been established, further chunks can be sent. Over a series of one or more connections, all of the chunks that make up an overall message can be sent.

If the breaking of a connection interrupts the transmission or reception of a chunk, its transmission or reception is started again when a new connection is made. Here, the reception of a chunk includes its safe storage. If the sender or receiver (including an intermediary store) differ on whether or not a chunk has been successfully transmitted or received, then the reliability layer will sort out this difficulty (e.g., via re-transmission and/or ignoring of duplicates).

In particular, the transmission of chunks is independent of the underlying transport (including the network and protocol), so progress can be made towards the eventual transmission/receiving of an overall message or set of messages, even though the series of connections used to achieve the overall transmission/receiving can use different underlying transports (including the network and protocol).

At either side of the communications link, many of the communication details can change between one connection and the next. For example, the machine's name, network address and the port number used can all change, as well as the network type and the protocol used. Embodiments of the present invention allow for this eventuality because some remote machines, in particular, can be mobile and as they move they may need to use different network and protocol types. The communication details, such as the network address, of the machine could change, for example as the machine is taken from location to location and connected to different networks.

Thus, embodiments of the present invention permit a new connection to be set up between the two machines if all of the uploading and downloading has not completed, or if a new set of uploading and downloading is to commence. One of the machines must be able to find the other, and it can do this as long as it can find the new identity of the other machine and its communication details from some source. One particular technique for providing this facility relies on every communicating machine to have an agent ID. This ID must be unique within an administrative domain.

As discussed previously, in some arrangements, there is an intermediary store between the sender and receiver of a message. The sender of a message sets up one or a series of connections (of the same or of different types) in order to transmit the message or messages to the intermediary store. The receiver of a message sets up one or a series of connections (of the same or of different types) in order to receive the message or messages from an intermediary store.

While the identity and communication details of the sender and receiver of a message or set of messages may change between connections, the identity of an intermediary store can be more stable. This facilitates the sender and/or receiver changing their identity and/or communication details, because they can still find an intermediary store after such a change. Although, alternative embodiments of the present invention explicitly contemplate that the identity and/or communication details of an intermediary store can change, as long as the other machines are given details about the new identity and/or communication details.

An intermediary store can be one machine, or it can be a set of machines. In the latter case, all of the messages can be available on all of the machines, or the set of messages can be partitioned in some way across the set of machines.

Some advantages (not exhaustive) of the present invention and various embodiments:

a. When the connection is dropped the message transmission can be resumed (without having to resend the whole message) even if the underlying protocol is different. This applies to situations with only a single message as well as situations where many messages are involved.

b. Messages can be sent when there is no possibility of immediately connecting at all. In this case, the messages will be received as soon as a network connection becomes available. Whenever a message is sent, it is accepted by the transport. At this stage, it may still be undecided over which transport the message will eventually flow. The actual transport the message will be transported over can be dependent on which transport happens to be available first.

c. Messages can be removed by the sender while they are in transit, meaning that unreceived portions will not be received any more and received portions of this message will be discarded. When fragments of messages are received, they are stored locally until all the fragments of a certain message have made it across the network to the receiving agent. If a message has been retracted by the sender, the fragmentation service will take care of recording this event and removing the associated fragments wherever fragments relating to this message have been received in order to not leave partially received messages dangling.

d. Messages can also be assigned stamps. When switching physical transport networks or protocols, rules related to these message stamps and/or the actual stamps can change too. Here are some examples:

The network changes: The rules can be set up so that portions of message 1 can be sent/received over network A or network B while portions of message 2 can only be sent only sent/received over network A. If messages are currently being sent over network A, but this becomes unavailable, and then a connection is made via network B, any pending fragments of message 1 will continue to be delivered, but any pending fragments of message 2 won't.

The network and the rules change: As above, but at the time of switching physical networks (say from B to A), the stamp rules associated with the transport might also be changed. An example of such a situation is where the rules have changed such that when we move back from transport B to transport A in our previous example, A won't resume receiving fragments of message 2 because the rules have changed. Another example would be that when connected to transport B, the rules change so that it, from that moment on, will also start to communicate pending fragments of message.

The network, rules and stamps change: As in our examples before, but including the fact that the actual stamps on the messages could also change. So a certain message may not qualify to be transmitted through transport A at time x (because of the rules associated with transport A), it may be qualified to be transmitted through transport A at time y, not because the rules of transport A have changed, but because the stamp(s) on the message changed.

e. Using an intermediary store and a plurality of protocols/networks to reach this store when sending the messages and a (potentially different, overlapping or non-overlapping) plurality of protocols/networks when receiving the messages from the intermediary. As an example, take an agent A that can communicate over HTTP and/or FTP. Agent B can communicate over NFC (NetFileCopy) and SMTP. When A sends a message to B via the intermediary store, portions of this message could be sent over HTTP and portions of the message could be sent over FTP to the intermediary store. Agent B could receive portions over NFC and portions over SMTP from the intermediary store.

f. When a fragment is partially transmitted (sent or received), this fragment will have to be retransmitted later to ensure reliable delivery. Retransmission of a fragment may be done over the same physical network as the first attempt (or in general, previous attempts) to transmit it or it may be done over an alternative physical network.

CONCLUSION

A system and method has been shown in the above embodiments for the effective implementation a method and system for recoverable message exchange independent of network protocols. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional IBM PC or equivalent, multi-nodal system (e.g. LAN) or networking system (e.g. Internet, WWW, wireless web). All programming and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of communications programming.

What is claimed is:

1. A method for ensuring the completion of interrupted message transfers between a first and second device, said method comprising:
   a) generating and storing a message at said first device;
   b) separating said message into a plurality of fragments;
   c) establishing a first network connection between said first and second device;
   d) initiating a transfer of said plurality of fragments from said first device to said second device using said first network connection;
   e) determining if said first network connection has been interrupted;
   f) if so, establishing a subsequent network connection with said second device;
   g) identifying which, if any, of the plurality of fragments have not been transferred to said second device;
   h) transferring, via the subsequent network connection, any of the plurality of fragments which had not been transferred;
   i) repeating steps e-h until said message transference is complete;
   j) reassembling said fragments at said second device to duplicate said sent message, and
   wherein said message can be retracted by a sender of said message while it is in transit by discontinuing, at said second device, receiving additional message fragments and discarding received portions.

2. The method of claim 1, wherein said transferring comprises either a push or pull of message fragments.

3. The method of claim 1, wherein for said network connections, one or more characteristics of said first network connection are potentially different than said subsequent network connection.

4. The method of claim 3, wherein said one or more characteristics include any of: application protocol, security, speed, reach, bandwidth capability, cost of usage, network type, physical layer type, data-link layer type, and IP address of one or both of the first and second devices.

5. The method of claim 4, wherein the application protocol is one of: HTTP, FTP, Telnet, CORBA, IIOP, or HTTPS.

6. The method of claim 4, wherein the network type is one of WiFi, Bluetooth, GPRS, GSM, Frame Relay, or LAN.

7. The method of claim 1, further comprising the step of: retransferring any of the plurality of fragments not received by the second device.

8. The method of claim 1, further comprising the step of: repeating steps a-j for a plurality of different messages.

9. The method of claim 1, wherein said method comprises an intermediary store and a plurality of protocols/networks to reach this store when transferring one or more messages and a potentially different, overlapping or non-overlapping plurality of protocols/networks when transferring said one or more messages from the intermediary store.

10. The method of claim 1, further comprising the steps of:
associating a first identifier with the first device;
associating a second identifier with the second device, and
wherein said first and second identifiers retain their same respective values while transmitting any respective fragments via said network connections.

11. The method of claim 1, wherein when a connection is dropped, the message transfer can be resumed without having to resend the whole message, even if the underlying protocol is different.

12. The method of claim 1, wherein whenever the message is sent, it is accepted by a transport of the first device, regardless of whether a decision has been made over which network connection the message will eventually flow, with the actual network connection dependent on which connection is accepted by the transport.

13. The method of claim 1, wherein said messages are assigned stamps which are in association with a set of rules that are used to determine items such as the order of transmission or reception of one or more messages, which messages are to be transmitted or received over a given network.

14. The method of claim 13, wherein said rules are changed over time, potentially changing the order of transmission or reception of said one or more messages.

15. The method of claim 13, wherein said stamps are changed over time, potentially changing the order of transmission or reception of said one or more messages.

16. A system for exchanging messages between a first device and a second device, said system ensuring the completion of interrupted message transfers between said first and second devices, said system comprising:
a) said first device with a memory configured to generate and store a message;
b) a first fragmentation layer configured to separate said message into one or more fragments;
c) a first network link establishing a first network connection between said first and second device;
d) a transport layer configured to initiate a transfer of said one or more fragments from said first device to said second device using said first network connection;
e) a mechanism to determine if said first network connection has been interrupted, and if so, said mechanism configured to establish a subsequent network connection with said second device;
f) a tracking mechanism identifying which, if any, of the fragments have not been transferred to said second device;
g) said transport layer configured to transfer, via the subsequent network connection, any of the fragments which had not been transferred;
h) a fragmentation layer of said second device reassembling said fragments at said second device to duplicate said message stored at said first device, and
wherein said message can be retracted by a sender of said message while it is in transit by discontinuing, at said second device, receiving additional message fragments and discarding received portions.

17. The system of claim 16, wherein for a plurality of network connections, one or more characteristics of each network connection are potentially different.

18. The system of claim 17, wherein said one or more characteristics include any of: application protocol, security, speed, reach, bandwidth capability, cost of usage, network type, physical layer type, data-link layer type, and IP address of one or both of the first and second devices.

19. The system of claim 18, wherein the application protocol is one or more of: HTTP, FTP, Telnet, CORBA, IIOP, or HTTPS.

20. The system of claim 18, wherein the network type is one or more of: WiFi, Bluetooth, GPRS, GSM, Frame Relay, or LAN.

21. The system of claim 16, further comprising:
a first identifier associated with the first device, a second identifier associated with the second device, and wherein the first and second identifiers retain their same respective value across both the first and subsequent network connections.

22. The system of claim 16, wherein said system additionally comprises an intermediary store and a plurality of protocols/networks to reach this store when transferring the messages and a potentially different, overlapping or non-overlapping plurality of protocols/networks when transferring the messages from the intermediary.

* * * * *